(12) United States Patent
Zhang et al.

(10) Patent No.: US 11,833,613 B2
(45) Date of Patent: Dec. 5, 2023

(54) SYSTEM FOR CONTROLLING OVERLAPPING IN SINGLE-LAYER LASER CLADDING OF A SHAFT-LIKE WORKPIECE

(71) Applicant: SHANDONG UNIVERSITY, Shandong (CN)

(72) Inventors: Chengrui Zhang, Shandong (CN); Yisheng Yin, Shandong (CN); Wei Ma, Shandong (CN); Jie Wu, Shandong (CN); Tieshuang Zhu, Shandong (CN); Tianliang Hu, Shandong (CN)

(73) Assignee: SHANDONG UNIVERSITY, Ji'nan (CN)

( * ) Notice: Subject to any disclaimer, the term of this patent is extended or adjusted under 35 U.S.C. 154(b) by 159 days.

(21) Appl. No.: 17/503,498

(22) Filed: Oct. 18, 2021

(65) Prior Publication Data
US 2022/0032400 A1    Feb. 3, 2022

Related U.S. Application Data

(60) Division of application No. 17/199,227, filed on Mar. 11, 2021, now Pat. No. 11,179,805, and a (Continued)

(30) Foreign Application Priority Data

Aug. 29, 2019  (CN) ......................... 201910809048.X
Sep. 3, 2019   (CN) ......................... 201910827760.2

(51) Int. Cl.
*B23K 26/34*    (2014.01)
*B23K 26/03*    (2006.01)
*B23K 26/32*    (2014.01)

(52) U.S. Cl.
CPC ............ *B23K 26/34* (2013.01); *B23K 26/032* (2013.01); *B23K 26/32* (2013.01)

(58) Field of Classification Search
CPC ........ B23K 26/32; B23K 26/34; B23K 26/03; B23K 26/032; C23C 24/10; G06F 17/15; G06F 17/13
See application file for complete search history.

(56) References Cited

U.S. PATENT DOCUMENTS 5,837,960 A    11/1998  Lewis et al.
10,889,098 B2   1/2021  Yamazaki et al.
(Continued)

FOREIGN PATENT DOCUMENTS

CN    1971457 A       5/2007
CN    103713581 A  *  4/2014
(Continued)

*Primary Examiner* — Dana Ross
*Assistant Examiner* — Kuangyue Chen

(57) ABSTRACT

A system for controlling overlapping in single-layer laser cladding of a shaft-like workpiece includes an acceleration time calculation module, a feed shaft displacement calculation module and a module for adjusting an initial zero position of a laser head in a feed direction. Using the system, the motions of the spindle and the feed shaft are planned based on an S-curve acceleration and deceleration method. The motion planning is dynamically adjusted considering the overlapping rate and the clamping allowance of the workpiece to be cladded in a feed direction.

3 Claims, 10 Drawing Sheets

Related U.S. Application Data continuation of application No. PCT/CN2020/104741, filed on Jul. 27, 2020.

(56) References Cited

U.S. PATENT DOCUMENTS

| | | |
|---|---|---|
| 2013/0178952 A1 | 7/2013 | Wersborg |
| 2017/0293284 A1 | 10/2017 | Chen et al. |
| 2017/0312855 A1 | 11/2017 | Hooper |
| 2018/0333802 A1 | 11/2018 | Chang et al. |
| 2021/0197317 A1 | 7/2021 | Zhang et al. |

FOREIGN PATENT DOCUMENTS

| | | | |
|---|---|---|---|
| CN | 103713581 A | 4/2014 | |
| CN | 103938208 A | 7/2014 | |
| CN | 104831271 A | 8/2015 | |
| CN | 105904012 A | 8/2016 | |
| CN | 107839714 A | 3/2018 | |
| CN | 108103498 A * | 6/2018 | ........... C23C 24/106 |
| CN | 108103498 A | 6/2018 | |
| CN | 208246046 U | 12/2018 | |
| CN | 110093601 A | 8/2019 | |
| CN | 110408925 A | 11/2019 | |
| CN | 110528000 A | 12/2019 | |
| WO | 2005000517 A1 | 1/2005 | |

* cited by examiner

SYSTEM FOR CONTROLLING OVERLAPPING IN SINGLE-LAYER LASER CLADDING OF A SHAFT-LIKE WORKPIECE

CROSS-REFERENCE TO RELATED APPLICATIONS

This application is a divisional application of U.S. patent application Ser. No. 17/199,227, filed on Mar. 11, 2021, which is a continuation of International Patent Application No. PCT/CN2020/104741 with a filing date of Jul. 27, 2020, which claims the benefit of priority from Chinese Patent Application No. 201910809048.X with a filing date of Aug. 29, 2019 and Chinese Patent Application No. 201910827760.2 with a filing date of Sep. 3, 2019. The content of the aforementioned applications, including any intervening amendments thereto, is incorporated herein by reference.

TECHNICAL FIELD

This application relates to laser cladding, and more particularly to a system for controlling overlapping in single-layer laser cladding of a shaft-like workpiece.

BACKGROUND

The statements presented herein are only intended to provide background technical information related to the application, and do not necessarily constitute the prior art.

Laser cladding is a modification technology that adopts high-energy laser beams to quickly melt the cladding material and the substrate surface to produce a coating surface with different compositions and properties. Since laser cladding can obtain coatings of high hardness, wear resistance, corrosion resistance, high temperature resistance and thermal barrier, it is widely adopted in the industries such as national defense and military industry, aerospace, mining machinery, petrochemicals, automobiles and ships, and mold metallurgy, thereby achieving surface modification, parts repair, coating processing and accumulation forming.

The overlapping rate of laser single-layer cladding refers to a ratio of a width of an intersection of two cladding layers to a width of a single cladding layer, which plays a crucial role on the forming quality of the cladding layer. The overlapping rate is accurately controlled in the single-layer cladding process to obtain a cladding layer with a smooth surface and a dense structure, thereby achieving a high-quality cladding effect.

In the prior art, it is required to strictly control the motion relationship between the spindle and the feed shaft in the single-layer overlap laser cladding process of shaft parts, that is, the shutter is open to emit light for cladding when the spindle and the feed shaft both reach their preset velocities. The traditional motion system of a laser cladding machine generally carries out the motion planning for the spindle and the feed shaft based on the motion relationship thereof when the overlapping rate is reached, in which the clamping allowance of the workpiece in a feed direction is ignored. This will lead to a contradiction between the clamping allowance of the workpiece in the feed direction and the motion planning of the spindle and the feed shaft, affecting the processing quality and processing efficiency of the workpiece, and failing to meet the requirements of high-velocity laser cladding processing.

SUMMARY

In order to solve the above-mentioned problems, the disclosure provides a system for controlling overlapping in single-layer laser cladding of a shaft-like workpiece. The motion planning is dynamically adjusted by comprehensively considering the overlapping rate and workpiece clamping allowance, thereby improving the processing efficiency of the workpiece and the quality of the workpiece cladding layer.

The technical solutions of the disclosure are described as follows.

In a first aspect, the present disclosure provides a method for controlling overlapping in single-layer laser cladding of a shaft-like workpiece, comprising:
  (1) acquiring a shaft diameter of the shaft-like workpiece to be processed, a feed rate of a feed shaft and a laser cladding width to obtain a calculation formula of an overlapping rate; and planning a motion of the feed shaft and a motion of a spindle based on a rotational velocity of the spindle and an S-curve acceleration and deceleration planning algorithm; and calculating a feed velocity of the feed shaft to obtain an acceleration time of the spindle and an acceleration time of the feed shaft;
  (2) determining whether the acceleration time of the spindle is equal to the acceleration time of the feed shaft; if yes, calculating a displacement of the feed shaft and proceeding to step (4); otherwise, determining whether the acceleration time of the spindle is greater than the acceleration time of the feed shaft; if yes, after the feed shaft is accelerated to a preset velocity, keeping the feed shaft at the preset velocity until the spindle reaches the preset velocity; otherwise, proceeding to step (3);
  (3) re-planning the motion of the spindle according to S-curve acceleration and deceleration; adding a period of uniform acceleration motion for the spindle or reducing a maximum jerk of the spindle to make the acceleration time of the spindle equal to the acceleration time of the feed shaft; calculating a total displacement of the feed shaft and proceeding to step (4); and
  (4) adjusting an initial zero position of a laser head in a feed direction according to a difference between the total displacement of the feed shaft and a preset clamping allowance.

The present disclosure further provides another method for controlling overlapping in single-layer laser cladding of a shaft-like workpiece, comprising:
  (1) acquiring a shaft diameter of the shaft-like workpiece to be processed, a feed rate of a feed shaft and a laser cladding width to obtain a calculation formula of an overlapping rate; and planning a motion of the feed shaft and a motion of a spindle based on a rotational velocity of the spindle and an S-curve acceleration and deceleration planning algorithm; and calculating a feed velocity of the feed shaft to obtain an acceleration time of the spindle and an acceleration time of the feed shaft;
  (2) determining whether the acceleration time of the spindle is equal to the acceleration time of the feed shaft; if yes, calculating a displacement of the feed shaft and proceeding to step (4); otherwise, determining whether the acceleration time of the spindle is greater than the acceleration time of the feed shaft; if yes, re-planning the motion of the feed shaft according to a triangular acceleration planning method; adding a period of uniform acceleration motion for the feed shaft or reducing a maximum jerk of the feed shaft to make the acceleration time of the spindle equal to the acceleration time of the feed shaft; and calculating a total displacement of the feed shaft; otherwise, proceeding to step (3);

(3) re-planning the motion of the spindle according to S-curve acceleration and deceleration; adding a period of uniform acceleration motion for the spindle or reducing a maximum jerk of the spindle to make the acceleration time of the spindle equal to the acceleration time of the feed shaft; calculating the total displacement of the feed shaft and proceeding to step (4); and (4) adjusting an initial zero position of a laser head in a feed direction according to a difference between the total displacement of the feed shaft and a preset clamping allowance.

In a second aspect, to solve the above-mentioned problem, the present disclosure provides a system for controlling overlapping in single-layer laser cladding of a shaft-like workpiece, in which the motion planning is dynamically adjusted by comprehensively considering the overlapping rate and the workpiece clamping allowance during a laser cladding process of the single-layer overlap of the shaft-like workpiece, thereby improving the processing efficiency and ensuring the quality of the cladding layer.

To achieve the above-mentioned object, the technical solutions of the disclosure are described as follows.

The present disclosure provides a system for controlling overlapping in single-layer laser cladding of a shaft-like workpiece, comprising:

an acceleration time calculation module, for obtaining a shaft diameter of the shaft-like workpiece to be processed, a feed rate of a feed shaft and a laser cladding width; obtaining a calculation formula of an overlapping rate; planning a motion of the feed shaft and a motion of a spindle based on a rotational velocity of the spindle and an S-curve acceleration and deceleration planning algorithm; calculating a feed velocity of the feed shaft to obtain acceleration time of the spindle and acceleration time of the feed shaft;

a feed shaft displacement calculation module, for determining whether the acceleration time of the spindle is equal to the acceleration time of the feed shaft; if yes, calculating a displacement of the feed shaft; otherwise, determining whether the acceleration time of the spindle is greater than the acceleration time of the feed shaft; if yes, after the feed shaft accelerates to a preset velocity, keeping the feed shaft at the preset velocity for a period of uniform motion until the spindle reaches the preset velocity; otherwise, re-planning a motion of the spindle according to S-curve acceleration and deceleration; adding a period of uniform acceleration motion for the spindle or reducing a maximum jerk of the spindle, to make the acceleration time of the spindle equal to the acceleration time of the feed shaft; and calculating the displacement of the feed shaft; and a module for adjusting an initial zero position of a laser head in a feed direction according to a difference between the displacement of the feed shaft and a preset clamping allowance.

The present disclosure further provides another system for controlling overlapping in single-layer laser cladding of a shaft-like workpiece, comprising:

an acceleration time calculation module, for obtaining a shaft diameter of the shaft-like workpiece to be processed, a feed rate of a feed shaft and a laser cladding width; obtaining a calculation formula of an overlapping rate, and planning a motion of the feed shaft and a motion of a spindle based on a rotational velocity of the spindle and an S-curve acceleration and deceleration planning algorithm; and calculating a feed velocity of the feed shaft to obtain acceleration time of the spindle and acceleration time of the feed shaft;

a feed shaft displacement calculation module, for determining whether the acceleration time of the spindle is equal to the acceleration time of the feed shaft; if yes, calculating a displacement of the feed shaft; otherwise, determining whether the acceleration time of the spindle is greater than the acceleration time of the feed shaft; if yes, re-planning a motion of the feed shaft according to an acceleration triangle planning method; adding a period of uniform acceleration motion of the feed shaft or reducing a maximum jerk of the feed shaft to make the acceleration time of the spindle equal to the acceleration time of the feed shaft; calculating the displacement of the feed shaft; otherwise, re-planning a motion of the spindle according to the S-curve acceleration and deceleration; adding the period of uniform acceleration motion for the spindle or reducing the maximum jerk of the spindle, to make the acceleration time of the spindle equal to the acceleration time of the feed shaft; and calculating the displacement of the feed shaft; and a module for adjusting an initial zero position of a laser head in a feed direction according to a difference between the displacement of the feed shaft and a preset clamping allowance.

In a third aspect, the present disclosure provides a method for dynamically adjusting a height of a laser head of a laser cladding machine. Aimed at the particularity of continuous deflection and deformation of heavy and long-axis workpieces, the present disclosure effectively realizes a dynamic adjustment of the height of the laser head during the laser cladding process, and pre-compensates the workpiece deflection and deformation in real time and accurately, to improve the processing quality. This method of the present disclosure has the advantages of high precision, high real-time, high dynamics, simple structure and convenient maintenance.

To achieve the above-mentioned object, the technical solutions of the disclosure are described as follows.

The present disclosure provides a method for dynamically adjusting a height of a laser head of a laser cladding machine, the laser cladding machine comprising a laser head, a laser displacement sensor, an input and output module and a controller; the laser displacement sensor being arranged on the laser head and biased forward in a feed direction;

the method comprising:

during operation of the laser cladding machine, dynamically interpreting, by the controller, a current working area of the laser head according to position information fed back by each shaft encoder;

after the laser head moves to a position of a workpiece to be processed, taking out, by the controller, parameters of an interpolation function of the workpiece in a corresponding area;

generating a deflection compensation error of the workpiece at a current position of the laser head according to the parameters of the interpolation function to dynamically adjust the height of the laser head according to the deflection compensation error;

collecting, by the laser displacement sensor, discrete distance information between the laser head and the workpiece and current position information of the laser head, and sending, by the laser displacement sensor, the collected discrete distance information and the current position information to the controller;

receiving, by the controller, the discrete distance information and the current position information sent by the laser displacement sensor, and performing, by the controller, conversion of relative positions of the discrete distance information and the current position information, to obtain global coordinate points in a coordinate system of the laser cladding machine;

storing and refreshing, by the controller, the obtained global coordinate points to take out the global coordinate points in batch; obtaining, by the controller, a continuous local quartic interpolation function of the workpiece using a quartic interpolation method; calculating a compensation value of the workpiece deflection error at a current target position of the laser head by using function parameters corresponding to a current position of the laser head, to correct a target position of the laser head, thereby adjusting a motion of the laser head.

In a fourth aspect, the present disclosure provides a device for dynamically adjusting a height of a laser head of a laser cladding machine. Aimed at the particularity of continuous deflection and deformation of heavy and long-axis workpieces, the present disclosure effectively realizes a dynamic adjustment of the height of the laser head during the laser cladding process, and pre-compensates the workpiece deflection and deformation in real time and accurately, to improve the processing quality. This device of the present disclosure has the advantages of high precision, better real-time nature, high dynamics, simple structure and convenient maintenance.

To achieve the above-mentioned object, the technical solutions of the disclosure are described as follows.

The present disclosure provides a device for dynamically adjusting a height of a laser head of a laser cladding machine, comprising:

a laser head;
a laser displacement sensor;
an input and output module; and
a controller;
wherein the laser displacement sensor is arranged on the laser head and is biased forward in a feed direction; the laser head is capable of driving the laser displacement sensor to move; the laser displacement sensor is configured to measure a distance between the laser head and a position of a workpiece to be processed, and obtain a discrete local deflection parameter of the workpiece to be processed according to the distance; the input and output module is configured to transmit the discrete local deflection parameter to the controller; the controller is configured to generate a continuous local deflection function from the discrete local deflection parameter by using a quartic interpolation method, and store the continuous local deflection function in a workpiece deformation compensation buffer; when the laser head moves to the position of the workpiece to be processed, the controller is also configured to calculate a compensation function according to the local deformation function in the workpiece deformation compensation buffer, and dynamically adjust the height of the laser head according to the compensation function; and
the controller is also configured to allocate a measurement data buffer, and data sent from the laser displacement sensor to the controller is temporarily stored in the measurement data buffer after being processed by the controller; the controller takes out the data in the measurement data buffer in batch sequentially, and removes the data from the measurement data buffer after the interpolation is completed to refresh the data.

In a fifth aspect, the present disclosure provides a system for dynamically adjusting a height of a laser head of a laser cladding machine. Aimed at the particularity of continuous deflection and deformation of heavy and long-axis workpieces, the present disclosure effectively realizes a dynamic adjustment of the height of the laser head during the laser cladding process, and pre-compensates the workpiece deflection and deformation in real time and accurately, to improve the processing quality. This system of the present disclosure has the advantages of high precision, better real-time nature, high dynamics, simple structure and convenient maintenance.

To achieve the above-mentioned object, the technical solutions of the disclosure are described as follows.

The present disclosure provides a system for dynamically adjusting a height of a laser head of a laser cladding machine, comprising:

a data acquisition system;
a data processing system;
an error compensation system; and
a motion control system;
wherein the laser cladding machine comprises a laser head, a laser displacement sensor, an input and output module, and a controller; the laser displacement sensor is arranged on the laser head and is biased forward in a feed direction; the laser head is capable of driving the laser displacement sensor to move; the laser displacement sensor is configured for measuring a distance between the laser head and a position of the workpiece;
the data acquisition system acquires, through the laser displacement sensor, a distance information between the laser head and the workpiece in real time at a preset frequency, obtains a discrete local deflection parameter of the workpiece according to the distance information, and then transmits the discrete local deflection parameter to the controller through the input and output module; the controller stores the discrete local deflection parameter;
the data processing system reads the discrete local deflection parameter of the workpiece sent by the data acquisition system in the controller and the current position information of the laser head obtained by the motion control system, and performs conversion of relative positions to obtain global coordinate points in a coordinate system of the laser cladding machine; the data processing system sends the processed global coordinate points to the controller; the controller stores the global coordinate points in a measurement data buffer and refreshes the measurement data buffer;
the error compensation system takes out the global coordinate points in batch from the measurement data buffer, obtains a continuous local quartic interpolation function using a quartic interpolation method, and stores parameters of the quartic interpolation function in an error compensation buffer of the controller; and
the motion control system dynamically interprets a current working area of the laser head in each communication cycle, takes out parameters of an interpolation function temporarily stored in the error compensation buffer which corresponds to the current working area of the laser head, and calculates a current error compensation value of the laser head according to the parameters of the interpolation function to correct a current target position of the laser head; and the motion control system refreshes the data in the error compensation buffer, and sends a motion instruction to dynamically adjust the height of the laser head.

Compared to the prior art, this application has the following beneficial effects.

(1) In the disclosure, the motions of the spindle and the feed shaft are planned based on the S-shaped curve acceleration and deceleration method. The motion planning is dynamically adjusted by comprehensively considering the overlapping rate and the clamping allowance of the workpiece to be cladded in a feed direction, so that the contradiction between the workpiece clamping allowance and the motion planning of the spindle and feed shaft is effectively solved, thereby improving the processing efficiency of the workpiece and the quality of the cladding layer.

(2) In the disclosure, the overlapping rate of the single-layer laser cladding is calculated based on the geometric method, in which the algebraic relationship among the feed rate, the diameter of the shaft-like workpiece and the laser cladding width can be obtained based on the drawn geometric figures. According to the mathematical relationship between the feed rate and the rotational velocity of the spindle, the calculation method of the overlapping rate is derived. In practical applications, the feed velocity of the feed shaft can be calculated quickly, efficiently and accurately according to the known production conditions.

(3) When the newly planned feed velocity of the feed shaft (or the rotational velocity of the spindle) is greater than the preset velocity of the feed shaft (or the spindle), the maximum jerk of the feed shaft (or the spindle) needs to be reduced to make the newly planned velocity of the feed shaft (or the spindle) equal to the preset velocity of the feed shaft (or the spindle). When the newly planned feed velocity of the feed shaft (or the rotational velocity of the spindle) is less than the preset velocity of the feed shaft (or the spindle), a period of uniform acceleration motion is added for the feed shaft (or the spindle), to make the newly planned velocity of the feed shaft (or the spindle) equal to the preset velocity of the feed shaft (or spindle). Therefore, the method ensures the robustness and the dynamic performance of the system.

(4) The method adopted in the present disclosure is suitable for control systems of general laser cladding machines, which is highly adaptable to laser cladding machines without relying on dedicated hardware, and is suitable for the intelligent transformation and upgrade of control systems of the laser cladding machines.

(5) Considering that the moment of inertia of heavy and long shaft-like workpieces is generally large, when performing single-layer high-velocity laser cladding overlap, the rotational velocity of the spindle is appropriately reduced based on the spindle motion constraints, thereby ensuring that heavy and long shaft-like workpieces are not prone to deflection changes during the rotation process. Since heavy and long shaft-like workpieces can be approximately simplified to simply supported beams when supported at both ends, and it can be shown from the calculation that the deformation of simply supported beams under uniformly distributed gravity loads is a quartic function in a lateral length, the discrete data of workpiece deflection are processed in real time on-line using the quartic interpolation method to obtain a continuous function of partial workpiece deflection. In each communication cycle of the controller, the partial workpiece deformation function obtained in advance is provided for accurately calculating the current continuous deformation of the workpiece, thereby accurately compensating the deformation error at any point in the working area in real time.

(6) The double-buffering data interaction is adopted in the disclosure. The discrete distance data measured by the laser displacement sensor is firstly stored in the measurement data buffer. After the controller takes out a batch of processing from the measurement data buffer, the data of the obtained quartic interpolation function is stored in the workpiece error compensation buffer. After the machine processes to this area, the corresponding compensation value is calculated to eliminate the workpiece deflection error in real time. The double-buffering data interaction mode ensures the robustness and real-time performance of the system.

(7) In the disclosure, the laser displacement sensor is adopted to send the collected data to the controller through the standard IO module, which is unified with the motion control. The system is controlled by one controller, to ensure the synchronization of measurement and control. Therefore, the present invention has better real-time characteristics and a simple structure, thereby improving the adaptability of the machine.

BRIEF DESCRIPTION OF THE DRAWINGS

The drawings of the specification constituting a part of the present disclosure are used to provide a further understanding of the present disclosure. The exemplary embodiments and descriptions of the present disclosure are used to explain the present disclosure, and are not intended to limit the scope of the present disclosure.

Figure 1:
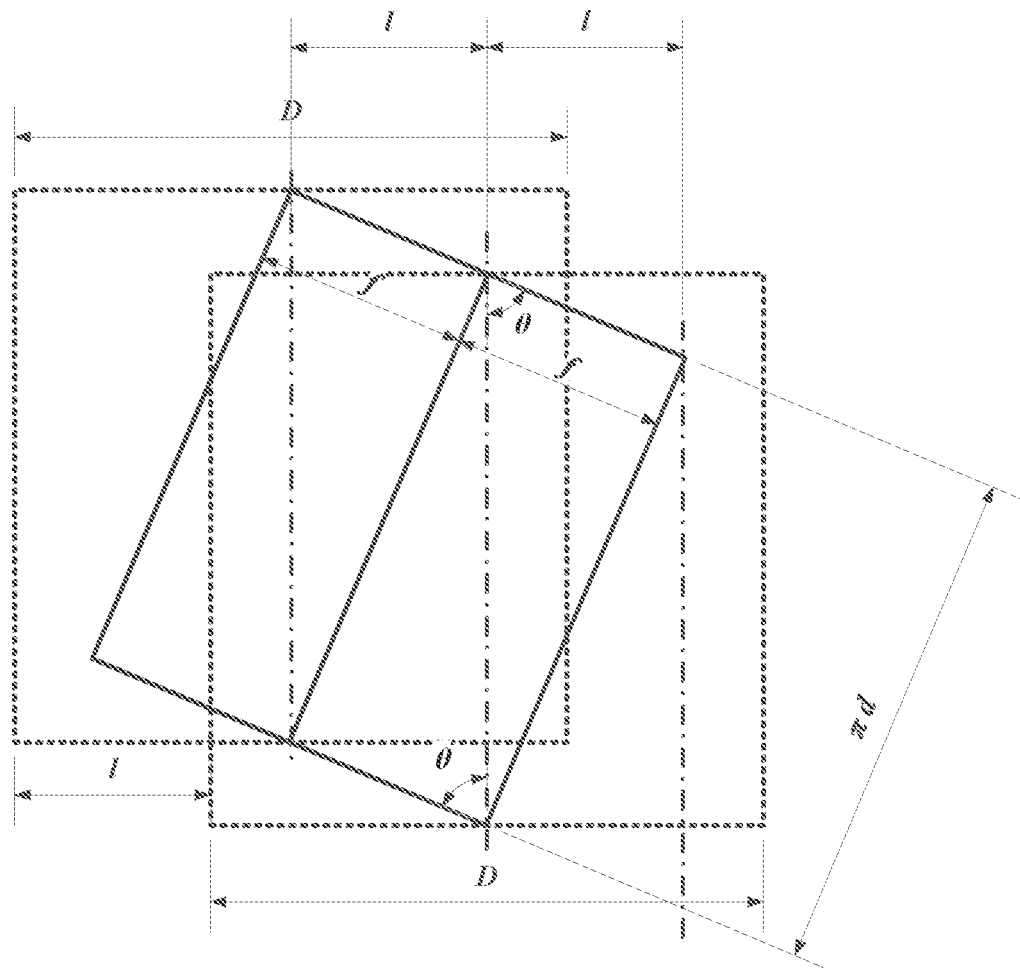
FIG. 1 schematically shows calculation of an overlapping rate using a geometric method according to an embodiment of the disclosure.

In the drawings: 1, laser displacement sensor; 2, sensor flange; 3, laser head; 4, workpiece; 5, controller; 6, servo driver; 7, motor; 8, standard IO module; 9, chuck; 10, feed shaft; and 11, spindle.

DETAILED DESCRIPTION OF EMBODIMENTS

The present disclosure will be further described in detail below with reference to the accompanying drawings and the embodiments.

It should be pointed out that the following detailed descriptions are all illustrative and are intended to provide further explanations for the application. Unless otherwise indicated, all technical and scientific terms adopted herein have the same meaning as commonly understood by those of ordinary skill in the corresponding technical field.

It should be noted that the terms used herein are only for describing specific implementations, and are not intended to limit the exemplary implementations according to the present disclosure. As used herein, unless specified, a singular form is also intended to include the plural form. In addition, it should also be understood that when the terms "comprise" and/or "include" are used in this specification, it indicates the existence of features, steps, operations, devices, components, and/or combinations thereof.

In this application, terms such as "up", "down", "left", "right", "front", "rear", "vertical", "horizontal", "side" and "bottom" indicate the orientation or the position relationship as shown in the drawings. The terms are only relationship terms for facilitating understanding the structural relationship of components or elements in this application, which are not intended to limit this application.

In this application, terms such as "fix", "connect", and "link" should be understood in a broad sense. For example, "fix" may result in a fixed connection, a detachable connection, or an integrated configuration of elements. The elements may be directly connected or indirectly connected through an intermediate medium. For the relevant scientific research or technical personnel in the field, the specific meaning of the above terms in this application can be determined according to the specific situation, and they should not be understood as a limitation of this application.

Method for Controlling Overlapping in Single-Layer Laser Cladding of Shaft-Like Workpiece In a single-layer laser cladding overlap process of the shaft-like workpiece, it is required to strictly control the motion relationship between the spindle and the feed shaft. The shutter must be opened for the laser cladding after the spindle and the feed shaft reach the preset velocity.

In view of the contradiction between the clamping allowance of the workpiece in a feed direction and the motion planning of the spindle and the feed shaft in the traditional motion control system of a laser cladding machine, the application provides a method for controlling overlapping in single-layer laser cladding of a shaft-like workpiece, in which the motion planning is dynamically adjusted by comprehensively considering the overlapping rate and the clamping allowance of the workpiece, thereby improving the processing efficiency of the workpiece and ensuring the quality of the cladding layer of the workpiece.

The technical solutions of the present application will be described in detail below in conjunction with specific embodiments.

The technical solution of the method for controlling overlapping in single-layer laser cladding of the shaft-like workpiece in this embodiment is as follows.

The calculation formula of the overlapping rate is derived using the geometric method, and the feed velocity of the feed shaft, the acceleration time of the spindle and the acceleration time of the feed shaft are calculated according to the known production conditions.

An adjustment strategy for the motion planning of the spindle and feed shaft is obtained by comparing the acceleration time of the spindle and the acceleration time of the feed shaft and making different decisions based on the comparison results.

Finally, a total displacement of the feed shaft is calculated and the total displacement of the feed shaft is compared with the clamping allowance, thereby obtaining a zero position adjustment strategy of the machine.

Specifically, as shown in FIG. 1, the overlapping rate p refers to a ratio of a difference between the width of the N+1th laser cladding channel and the width of the Nth laser cladding channel to the width of the laser cladding (where N is a natural number greater than 1).

The derivation process of the geometric method is as follows.

Known conditions include:
a rotational velocity n (r/min) of the spindle;
a shaft diameter d (mm) of the workpiece to be processed;
a feed rate f (mm/r) of the feed shaft;
a width D (mm) of the laser cladding layer; and
a distance l (mm) between center lines of two adjacent laser cladding channels in the width direction.

Thus, the feed velocity $f_v$ of the feed shaft can be calculated as follows:

$$f_v = n \times f \quad (1).$$

As shown in FIG. 1, after depicting the processing path diagram and the sizes therein, it can be known that:

$$\tan\theta = \frac{\pi d}{f}; \quad (2)$$

$$\sin\theta = \frac{l}{f}. \quad (3)$$

Based on the definition, the formula for calculating the overlapping rate is as follows:

$$p = \frac{D-l}{D} \times 100\%. \quad (4)$$

Based on equations (2) and (3), the expression of $\cos\theta$ can be obtained as follows:

$$\cos\theta = \frac{l}{\pi d}. \quad (5)$$

Based on the formula $\sin\theta^2 + \cos\theta^2 = 1$, the expression of l can be derived as follows:

$$\left(\frac{l}{\pi d}\right)^2 + \left(\frac{l}{f}\right)^2 = 1; \quad (6)$$

$$l = \frac{\pi d f}{\sqrt{f^2 + \pi^2 d^2}}. \quad (7)$$

It can be known from the equations (4) and (7) that:

$$p = \frac{D - \frac{\pi d f}{\sqrt{f^2 + \pi^2 d^2}}}{D} \times 100\%. \quad (8)$$

In actual production, process planners generally directly specify the overlapping rate and the rotational velocity of the spindle, and the velocity of the feed shaft is unknown. Therefore, this embodiment further adopts the calculation formula of the overlapping rate and known conditions to inversely calculate the velocity $f_v$ of the feed shaft, as shown in the equation (9): (where the shaft diameter d of the workpiece to be processed, the overlapping rate p, the rotational velocity n of the spindle, and the width D of the laser cladding layer are known)

$$f_v = \frac{n\pi d D(1-p)}{\sqrt{\pi^2 d^2 - D^2(1-p)^2}}. \quad (9)$$

The method for calculating the overlapping rate derived from the geometric method of this embodiment has the advantages of fast and efficient properties. Firstly, according to the depicted geometric drawing, an algebraic relationship between the feed rate of the feed shaft, the diameter of the shaft-like workpiece to be processed, and the width of the laser cladding. Then, based on the mathematical relationship between the feed rate of the feed shaft and the rotational velocity of the spindle, the calculation method of the overlapping rate is finally derived.

In this embodiment, an S-curve acceleration and deceleration motion algorithm with excellent acceleration performance and good acceleration efficiency is adopted to plan the motion process of the spindle and the feed shaft. Firstly, the total time required for the spindle and the feed shaft to reach their respective preset velocities are calculated, and then the acceleration time of the feed shaft and the acceleration time of the spindle are compared.

If the acceleration time of the spindle is equal to the acceleration time of the feed shaft, directly proceed to the next step of calculating the total displacement of the feed shaft.

If the acceleration time of the spindle is greater than the acceleration time of the feed shaft, the current motion planning is required to be adjusted. After the feed shaft accelerates to the preset velocity, the preset velocity is maintained for a period of uniform motion until the spindle reaches the preset velocity; or the motion of the feed shaft is re-planned to make the spindle and the feed shaft reach their respective preset velocities with the same motion time. When a newly planned feed velocity of the feed shaft is greater than the preset velocity of the feed shaft, the maximum acceleration of the feed shaft is reduced to make the newly planned feed velocity of the feed shaft equal to the preset velocity of the feed shaft. When the newly planned feed velocity of the feed shaft is lower than the preset velocity of the feed shaft, the period of uniform acceleration motion of the feed shaft is added to make the newly planned feed velocity of the feed shaft equal to the preset velocity of the feed shaft.

If the acceleration time of the spindle is less than the acceleration time of the feed shaft, it is necessary to adjust the motion planning and re-plan the spindle motion to make the feed shaft and the spindle reach their respective preset velocities with the same motion time. When the newly planned spindle velocity is greater than the preset velocity of the spindle, the maximum jerk of the spindle needs to be reduced, to make the newly planned spindle velocity equal to the preset velocity of the spindle. When the newly planned spindle velocity is less than the preset velocity of the spindle, a period of uniform acceleration motion needs to be added for the spindle to make the newly planned spindle velocity equal to the preset velocity of the spindle.

Figure 2:
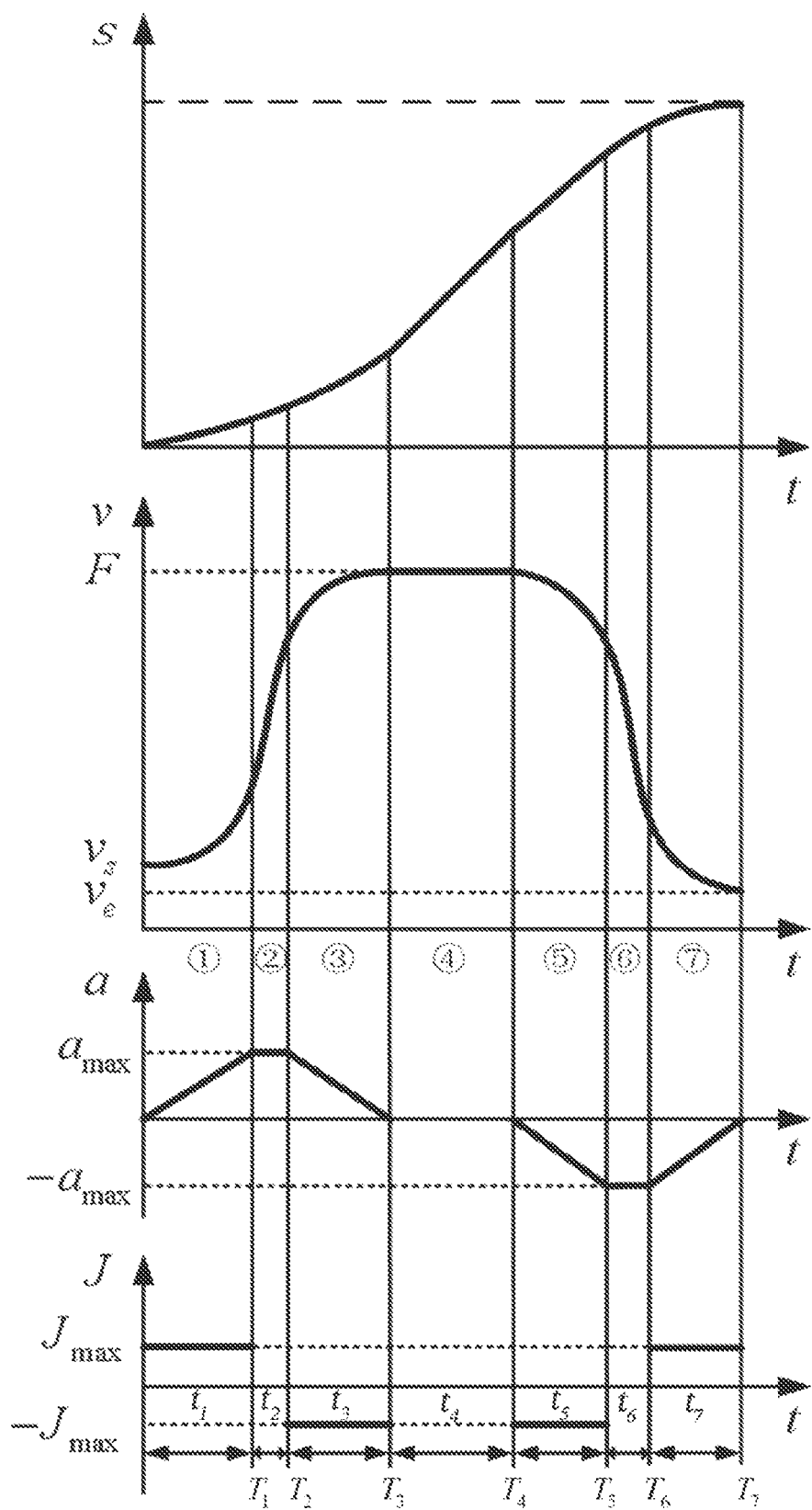
FIG. 2 is a schematic diagram of a seven-section S-shaped acceleration and deceleration curve according to an embodiment of the disclosure.

Specifically, the S-curve acceleration and deceleration motion algorithm is adopted to plan the motion of the rotational velocity n of the spindle and the feed velocity $f_v$ of the feed shaft. The S-curve velocity profile contains seven-section cubic spline functions, so that the feed shaft and the spindle can realize continuous change of acceleration, which can effectively reduce shock and oscillation. FIG. 2 shows the position, velocity, acceleration and jerk curves of the S-curve acceleration and deceleration process. The acceleration process includes a stage in which an acceleration is increasing, a stage in which an acceleration is constant and a stage in which an acceleration is decreasing. The deceleration process includes a stage in which a deceleration is increasing, a stage in which a deceleration is constant and a stage in which a deceleration is decreasing. The acceleration process and the deceleration process are changed through a uniform motion, and the whole process has seven stages. The equations of jerk j, acceleration a, velocity v and displacement s in the seven stages are as follows.

$v_s$ is the initial velocity. $v_1$~$v_6$ are the final velocities of the increasing acceleration stage, the uniform acceleration stage, the decreasing acceleration stage, the uniform velocity stage, the increasing deceleration stage, the uniform deceleration stage, and the decreasing deceleration stage, respectively. $T_1$~$T_7$ are the end time of the increasing acceleration stage, the uniform acceleration stage, the decreasing deceleration stage, the uniform velocity stage, the increasing deceleration stage, the uniform deceleration stage, and the decreasing deceleration stage, respectively. $t_1$~$t_7$ respectively are periods of the increasing acceleration stage, the uniform acceleration stage, the decreasing deceleration stage, the uniform velocity stage, the increasing deceleration stage, the uniform deceleration stage, and the decreasing deceleration stage. $a_{max}$ is the maximum acceleration and $j_{max}$ is the maximum jerk. $s_1$~$s_6$ are the displacements of the increasing acceleration stage, the uniform acceleration stage, the decreasing deceleration stage, the uniform velocity stage, the increasing deceleration stage, the uniform deceleration stage, and the decreasing deceleration stage, respectively.

$$j(t) = \begin{cases} j_{max} & 0 \le t \le T_1 \\ 0 & T_1 \le t \le T_2 \\ -j_{max} & T_2 \le t \le T_3 \\ 0 & T_3 \le t \le T_4 \\ -j_{max} & T_4 \le t \le T_5 \\ 0 & T_5 \le t \le T_6 \\ j_{max} & T_6 \le t \le T_7 \end{cases} \quad (10)$$

-continued $$a(t) = \begin{cases} j_{max} \times t & 0 \le t \le T_1 \\ a_{max} & T_1 \le t \le T_2 \\ a_{max} - j_{max} \times t & T_2 \le t \le T_3 \\ 0 & T_3 \le t \le T_4 \\ -j_{max} \times t & T_4 \le t \le T_5 \\ -a_{max} & T_5 \le t \le T_6 \\ -a_{max} + j_{max} \times t & T_6 \le t \le T_7 \end{cases} \quad (11)$$

$$v(t) = \begin{cases} v_s + \frac{1}{2} j_{max} \times t^2 & 0 \le t \le T_1 \\ v_1 + a_{max} \times t & T_1 \le t \le T_2 \\ v_2 + a_{max} \times t - \frac{1}{2} j_{max} \times t^2 & T_2 \le t \le T_3 \\ v_3 & T_3 \le t \le T_4 \\ v_4 - \frac{1}{2} j_{max} \times t^2 & T_4 \le t \le T_5 \\ v_5 - a_{max} \times t & T_5 \le t \le T_6 \\ v_6 - a_{max} \times t + \frac{1}{2} j_{max} \times t^2 & T_6 \le t \le T_7 \end{cases} \quad (12)$$

$$s(t) = \begin{cases} v_s \times t + \frac{1}{6} j_{max} \times t^3 & 0 \le t \le T_1 \\ s_1 + v_1 \times t + \frac{1}{2} a_{max} \times t^2 & T_1 \le t \le T_2 \\ s_2 + v_2 \times t + \frac{1}{2} a_{max} \times t^2 - \frac{1}{6} j_{max} \times t^3 & T_2 \le t \le T_3 \\ s_3 + v_3 \times t & T_3 \le t \le T_4 \\ s_4 + v_4 \times t - \frac{1}{6} j_{max} \times t^3 & T_4 \le t \le T_5 \\ s_5 + v_5 \times t - \frac{1}{2} a_{max} \times t^2 & T_5 \le t \le T_6 \\ s_6 + v_6 \times t - \frac{1}{2} a_{max} \times t^2 + \frac{1}{6} j_{max} \times t^3 & T_6 \le t \le T_7 \end{cases} \quad (13)$$

Specifically, the spindle reaches the preset velocity according to the S-curve acceleration and deceleration. The specific calculation of S-curve acceleration and deceleration motion is as follows.

Firstly, the time allocation of the spindle motion is planned. Since the motion only involves the spindle velocity from 0 to the preset velocity v, the first three stages in the S-curve acceleration and deceleration can be used ($a_{max}$ is the maximum acceleration that the spindle can withstand, $j_{max}$ is the maximum jerk that the spindle can withstand).

$$t_1 = \frac{a_{max}}{j_{max}}; \quad (14)$$

$$t_2 = \frac{v - v_s}{a_{max}} - t_1; \quad (15)$$

$$t_3 = t_1. \quad (16)$$

Firstly, whether $t_2$ is greater than 0 is determined. If $t_2 < 0$, then set $t_2 = 0$, and there is no uniform acceleration stage in the S-curve acceleration process, only the increasing acceleration stage and the decreasing acceleration stage, where the total time t of the spindle motion is as follows:

$$t = t_1 + t_3 \quad (17)$$

If $t_2 > 0$, then there is a uniform acceleration stage in the acceleration process of the S curve, and the uniform acceleration stage includes the increasing acceleration stage, the uniform acceleration stage and the decreasing acceleration stage, and the total time t of the spindle motion is as follows:

$$t = t_1 + t_2 + t_3 \quad (18)$$

The feed shaft is also planned to reach the preset velocity by the S-curve acceleration and deceleration. From the equation (9), the designated feed velocity of the feed shaft $f_v$ can be known, and the maximum acceleration $a_{max}$ and maximum jerk $j_{max}$ of the feed shaft are also known. These parameters are plugged into the equations (14)-(18) to calculate the shortest total time $t_f$ required for the feed shaft to reach the designated feed velocity.

Figure 3:
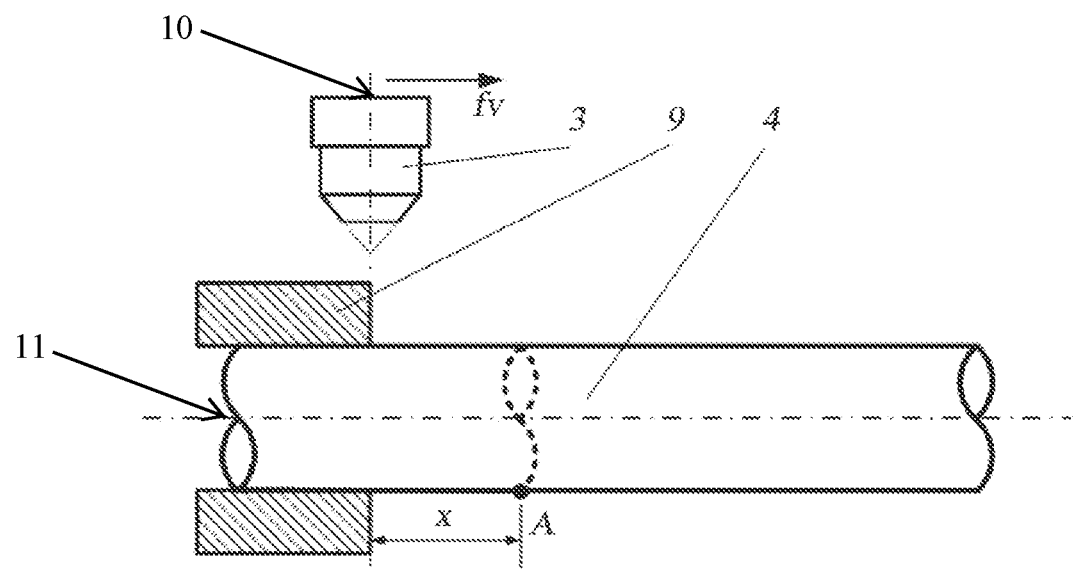
FIG. 3 schematically illustrates a positional relationship between a laser head and a workpiece clamping allowance according to an embodiment of the disclosure.

$t_s$ (total time required for the feed shaft to reach the designated feed velocity) and $t_f$ are compared, and the motion planning is adjusted by comprehensively considering the motion planning of the spindle, the motion planning of the feed shaft, and the clamping allowance of the workpiece to be processed in a feed direction. Before adjustment and analysis, the clamping allowance of the workpiece in the feed direction is set to a fixed value X. The specific requirements are shown in FIG. 3. In FIG. 3, the chuck 9 is provided for fixing the workpiece 4, and the laser head 3 is located above the fixed workpiece 4.

① If $t_s > t_f$, it is indicated that when the feed shaft 10 reaches the designated feed velocity, the spindle 11 is in the acceleration phase and does not reach the preset velocity, and the feed shaft 10 has enough time to accelerate to the preset velocity. At this time, it should be noted that: when the feed shaft 10 reaches the designated feed velocity, the position relationship between the laser head and a processing start point A. At this time, there are two cases to make the feed velocity of the feed shaft 10 reach the designated feed velocity when the spindle 11 reaches the preset velocity.

Figure 5:
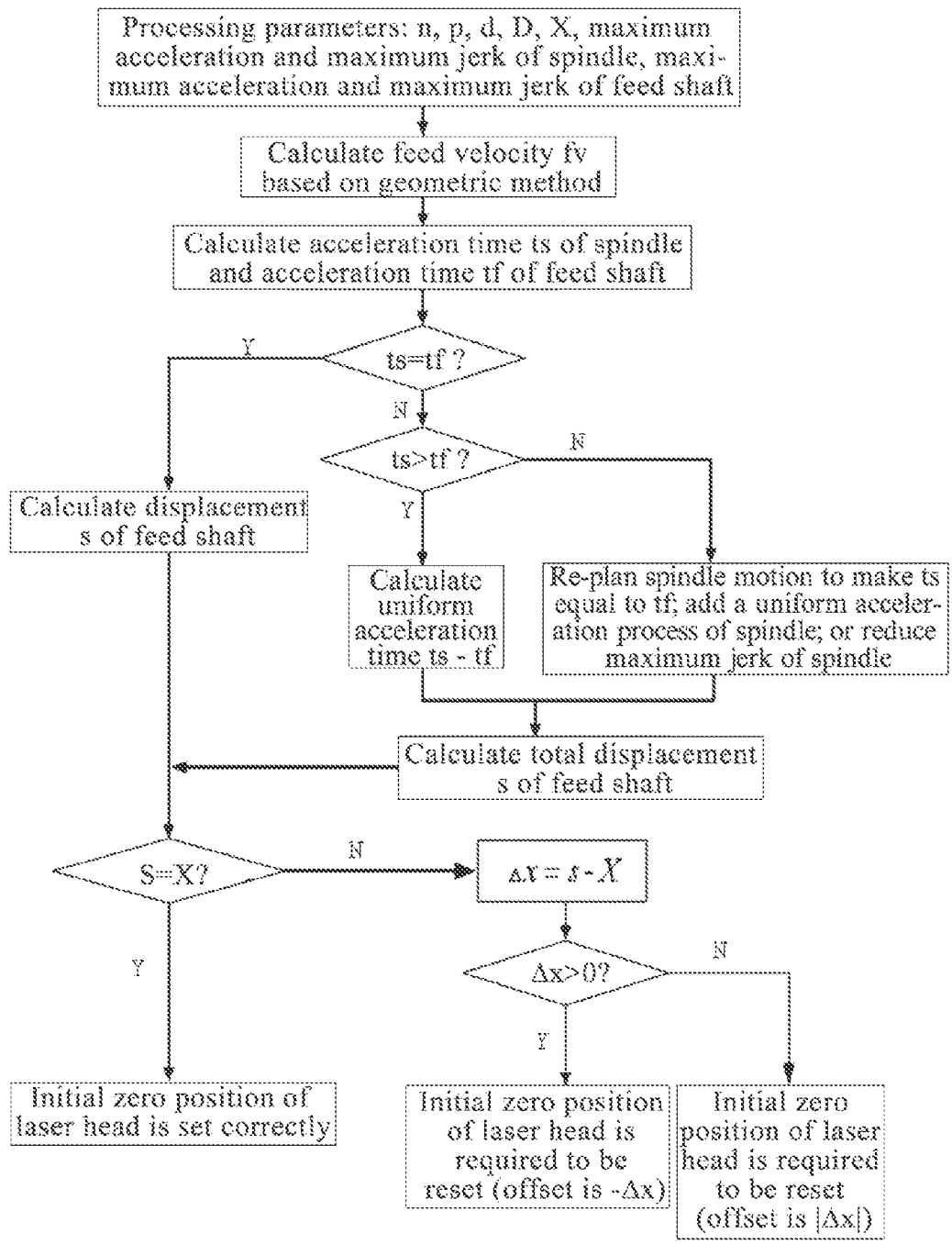
FIG. 5 is a schematic diagram of a method for controlling overlapping of a single-layer high-velocity laser cladding of a shaft-like workpiece according to an embodiment of the disclosure.

Case 1:
as shown in FIG. 5, when the feed shaft reaches the designated feed velocity, the spindle is in the acceleration phase and does not reach the preset velocity. The remaining time t for the spindle to reach the preset velocity is as follows:

$$t = t_s - t_f \quad (19)$$

During t, the feed shaft is controlled to move at a constant velocity according to the designated feed velocity, where the displacement s' of the constant velocity stage is as follows:

$$s' = f_v \times (t_s - t_f) \quad (20)$$

Based on the equations (13) and (20), the total displacement s of the feed shaft is as follows:

$$s = v_s \times t_1 + \frac{1}{6} j_{max} \times t_1^3 + (v_s + \frac{1}{2} j_{max} \times t_1^2) \times t_2 + \frac{1}{2} a_{max} \times t_2^2 + (v_s + \frac{1}{2} j_{max} \times t_1^2 + a_{max} \times t_2) \times t_3 + \frac{1}{2} a_{max} \times t_3^2 - \frac{1}{6} j_{max} \times t_3^3 + f_v \times (t_s - t_f) \quad (21)$$

At this time, the displacement difference ΔX between s and X is calculated, and s and X are compared as follows:

$$\Delta X = s - X \quad (22)$$

Figure 6:
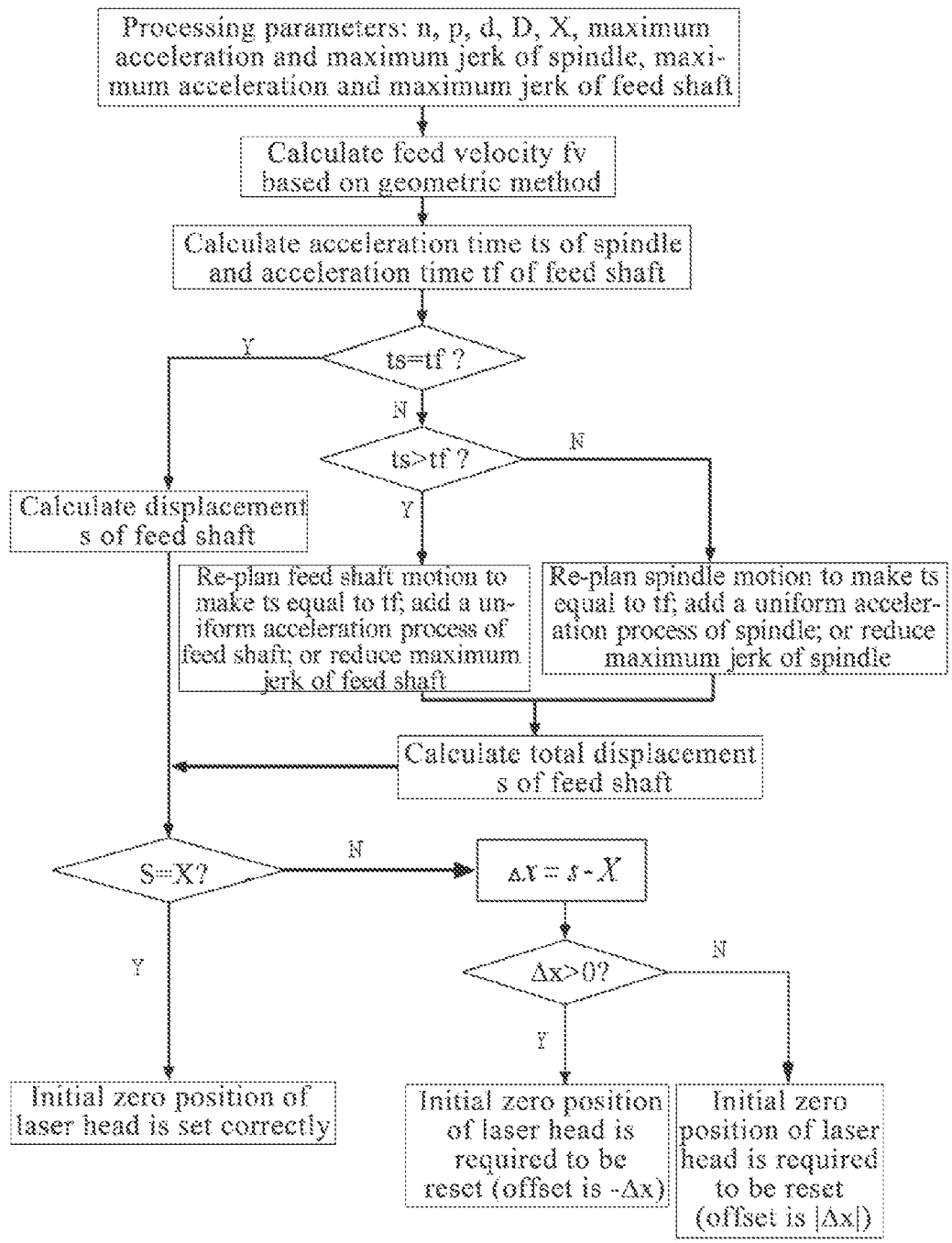
FIG. 6 is a schematic diagram of the method for controlling overlapping of the single-layer high-velocity laser cladding of the shaft-like workpiece according to another embodiment of the disclosure.

Case 2:
As shown in FIG. 6, since the acceleration time of the spindle is greater than the acceleration time of the feed shaft, and the S curve is planned according to the maximum acceleration and the maximum jerk of the spindle and the maximum acceleration and the maximum jerk of the feed shaft, the spindle and the feed shaft reach the shortest acceleration time. Since the time for the feed shaft to reach the designated feed velocity under the maximum motion constraint is shorter than the time for the spindle to reach the specified velocity under the maximum motion constraint, the motion parameters of the feed shaft can be changed at this time to make the time for the feed shaft to reach the designated feed velocity equal to the time for the spindle to accelerate to the preset velocity, thereby avoiding idling of the feed shaft.

At this time, it is necessary to perform the S curve velocity planning of the feed shaft, and first calculate the maximum acceleration that the feed shaft can reach in the current plan as follows:

$$a_{max} = t_1 \times j_{max} \qquad (23).$$

Figure 4:
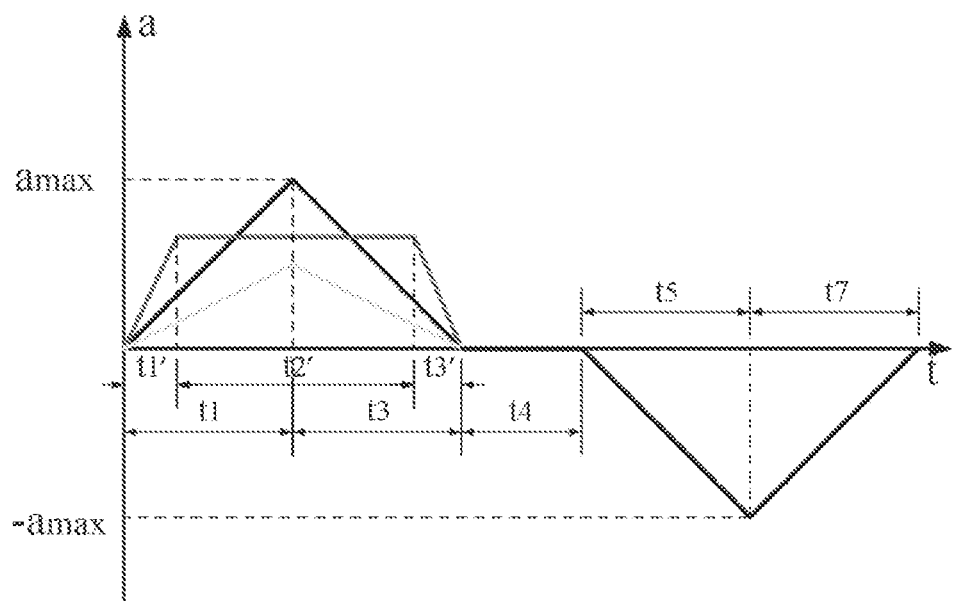
FIG. 4 is a schematic diagram of an acceleration triangle planning method according to an embodiment of the disclosure.

Then the triangular acceleration planning is performed for the acceleration of the feed shaft, that is, the uniform acceleration stage in the S-curve acceleration and deceleration planning is directly removed. From the acceleration triangle planning as shown in FIG. 4, it can be known that:

$$\begin{cases} t_1 = a_{max}/j_{max} \\ t_2 = 0 \\ t_3 = t_1 \\ t_4 = 0 \\ t_5 = t_1 \\ t_6 = 0 \\ t_7 = t_1 \end{cases} \qquad (24)$$

The acceleration triangle planning method of the feed shaft used in this embodiment makes the spindle and the feed shaft reach their respective preset velocities with the same time.

The start-up phase of laser cladding machine processing only involves the acceleration phase, and the time required for the increasing acceleration phase is equal to the time required for the decreasing acceleration phase, so the total acceleration time t is as follows:

$$t = t_1 + t_2 + t_3 \qquad (25).$$

The maximum velocity $v_{max}$ is as follows:

$$v_{max} = \frac{a_{max}^2}{j_{max}}. \qquad (26)$$

At this time, the restriction condition is added, that is, the time for the feed shaft to reach the designated feed velocity is equal to the time for the spindle to accelerate to the preset velocity. According to the equation (24), the value of $a_{max}$ can be derived as follows:

$$a_{max} = j_{max} \times \frac{t_s}{2}. \qquad (27)$$

Based on the equations (26) and (27), the maximum velocity that the feed shaft can reach through the increasing acceleration phase and the deceleration phase is as follows:

$$v_{max} = t_s^2 \times \frac{j_{max}}{4}. \qquad (28)$$

Then, the newly calculated feed shaft $v_{max}$ and the designated feed velocity $f_v$ are compared as follows.

If $v_{max} > f_v$, then the maximum jerk $j_{max}$ of the feed shaft needs to be reduced at this time, so the maximum acceleration of the feed shaft is reduced accordingly. As shown in FIG. 4, $v_{max} = f_v$, and thus the expression of the maximum jerk of the feed shaft is as follows:

$$j_{max} = \frac{4 f_v}{t_s^2}. \qquad (29)$$

At this time, the displacement s of the feed shaft is:

$$s = \tfrac{1}{2} \times f_v \times t_s \qquad (30).$$

If $v_{max} < f_v$, then it is required to add a period of uniform acceleration motion for the feed shaft at this time. As shown in FIG. 4, the feed shaft can accelerate to the designated feed velocity $f_v$ during the time $t_s$, and the relationship at this time satisfies:

$$\begin{cases} (t_1' + t_2' + t_3') \times a_{max} = f_v \\ t_1' + t_2' + t_3' = t_s \\ t_1' = t_3' \end{cases} \qquad (31)$$

The time $t_2'$ of the uniform acceleration motion of the feed shaft is obtained by solving the equation (31):

$$t_2' = \frac{2 f_v}{a_{max}} - t_s. \qquad (32)$$

At this time, the displacement s of the feed shaft is:

$$s = t_1' \times v_1 + (v_1 + v_2) \times \frac{t_2'}{2}. \qquad (33)$$

According to the planning method at this time, it can be seen that the $v_1$ of the feed shaft after the time $t_1'$, and the $v_2$ of the feed shaft after the time $t_1'$ and $t_2'$ are respectively:

$$\begin{cases} v_1 = a_{max} \times \frac{t_1'}{2} \\ v_2 = v_1 + t_2' \times a_{max} \end{cases} \qquad (34)$$

Based on the equations (31)-(34), the displacement s of the feed shaft can be obtained as follows:

$$s = \frac{3 f_v^2 + j_{max}^2 \times t_s^4 - 2 j_{max} \times f_v \times t_s^2}{4 j_{max} \times t_s}. \qquad (35)$$

If $v_{max} = f_v$, there is no need to adjust the motion parameters of the feed shaft at this time. Since the acceleration process of the feed shaft is only divided into the increasing acceleration stage and the decreasing acceleration stage, the displacement s of the feed shaft can be obtained as the equation (30).

By comparing the displacement s of the feed shaft in the feed direction when the feed shaft reaches the designated feed velocity in Case 1 and Case 2, the situation that is more suitable for the clamping allowance X of the workpiece in the feed direction is selected as the motion planning program of the feed shaft.

② If $t_s = t_f$, it is indicated that the spindle and the feed shaft reach their preset velocities with the same time, and the total displacement of the feed shaft can be directly calculated at this time. According to the known conditions and equation (13), the total displacement s of the feed shaft is:

$$s = v_s \times t_1 + \tfrac{1}{6} j_{max} \times t_1^3 + (v_s + \tfrac{1}{2} j_{max} \times t_1^2) \times t_2 + \tfrac{1}{2} a_{max} \times t_2^2 + (v_s + \tfrac{1}{2} j_{max} \times t_1^2 + a_{max} \times t_2) \times t_3 + \tfrac{1}{2} a_{max} \times t_3^2 - \tfrac{1}{6} j_{max} \times t_3^3 \quad (36).$$

③ If $t_s < t_f$, it is indicated that the time required for the spindle to accelerate to the preset velocity is less than the time required for the feed shaft to accelerate to the designated feed velocity. Considering that the long shaft parts generally have large moment of inertia, it is desirable to change the spindle motion parameters to allow the time for the spindle to accelerate to the preset velocity equal to the acceleration time of the feed shaft, thereby optimizing the stable acceleration performance of the spindle and improving production safety.

At this time, it is necessary to re-plan the S-curve velocity of the spindle. At first, the maximum acceleration that the spindle can achieve in the current plan is found, as shown in the equation (23). Similarly, the subsequent adjustment plan uses the acceleration triangle acceleration method shown in FIG. 4. Time distribution and the calculation of the maximum acceleration of respective phases can refer to the equations (24)-(26).

According to the equation (24), it can be derived that the $a_{max}$ of the spindle is calculated as follows:

$$a_{max} = j_{max} \times \frac{t_f}{2}. \quad (37)$$

According to the equations (26) and (37), the maximum velocity that the spindle can reach through the increasing acceleration phase and the decreasing acceleration phase is calculated as follows:

$$v_{max} = t_f^2 \times \frac{j_{max}}{4}. \quad (38)$$

Then, the newly calculated $v_{max}$ and the designated rotational velocity n of the spindle are compared as follows.

If $v_{max} > n$, then the maximum jerk $j_{max}$ of the spindle needs to be reduced at this time, and the maximum acceleration of the spindle is therefore reduced. As shown in FIG. 4, $v_{max} = n$, and the maximum jerk of the spindle is adjusted as follows:

$$j_{max} = \frac{4n}{t_f^2}. \quad (39)$$

If $v_{max} < n$, a period of uniform acceleration motion is required to be added in the motion of the spindle to enable the spindle to be accelerated to the preset rotational velocity n within the time $t_f$ (as shown in FIG. 4), and the relationship satisfies the following equation:

$$\begin{cases} (t_1' + t_2' + t_3') \times a_{max} = n \\ t_1' + t_2' + t_3' = t_f \\ t_1' = t_3' \end{cases} \quad (40)$$

The time $t_2'$ of the uniform acceleration motion of the spindle is obtained as follows by solving the equation (40):

$$t_2' = \frac{2n}{a_{max}} - t_f. \quad (41)$$

If $v_{max} = n$, there is no need to adjust motion parameters of the spindle at this time.

Further, the displacement s in the feed direction when the feed shaft accelerates to the designated feed velocity can be calculated according to the known conditions, and the calculation formula is the same as the equation (36).

In any case of the above ①, ② and ③, if there is a solution to the encountered problem in the corresponding interval, the solution is selected.

Then the relationship between the displacement s in the feed direction when the feed shaft accelerates to the designated feed velocity in ①, ② and ③ and the clamping allowance X of the workpiece in the direction of the feed shaft is analyzed. The zero position of the laser head in the feed direction is adjusted according to the equation (22). Therefore, when the spindle and the feed shaft reach their preset velocities at the same time, the laser head is exactly at the clamping allowance X. Under the premise of meeting the production requirements, it not only improves the processing efficiency of the workpiece, but also ensures the quality of the workpiece cladding layer. The specific situation is as follows.

If $\Delta x > 0$, when the laser head accelerates to the designated feed velocity from the original set zero position at this time, it will exceed the processing starting point over distance $\Delta x$ and cannot meet the production requirements, so the laser head zero position needs to be reset at this time. Considering that there may be interference between the laser head and the machine chuck, the laser head needs to move a distance of $\Delta x$ in a direction opposite to the feed direction at the zero position, and the laser head also needs to move a certain safety distance longitudinally in its height direction, thereby avoiding interference between the laser head and the machine chuck. The moved position of the laser head is adopted as the new zero position.

If $\Delta x = 0$, when the laser head accelerates to the designated feed velocity from the original set zero position, it will just reach the processing starting point without resetting the zero position.

If $\Delta x < 0$, when the laser head accelerates to the designated feed velocity from the original set zero position, there is still a certain distance from the processing starting point to the laser head. Therefore, it is necessary to reset the zero position of the laser head and take a position where the laser head has moved for $|\Delta x|$ distance in the feed direction as the new zero position.

Through the above method, the problem of calculating the overlapping rate of the single-layer overlap laser cladding of the shaft-like workpiece is solved, and the motion planning is dynamically adjusted by comprehensively considering the overlapping rate and workpiece clamping allowance, thereby effectively solving the contradiction between the workpiece clamping allowance and the motion planning of the spindle and the feed shaft. Based on the method, the single-layer overlap laser cladding control system for the shaft-like workpiece, in which the overlapping rate and the workpiece clamping allowance during the operation process are comprehensively considered, to dynamically adjust the motion planning of the spindle and the feed shaft. Moreover, the optimal strategy is selected according to different processing requirements, thereby improving the processing efficiency of the workpiece and ensuring the quality of the workpiece cladding layer.

System for Controlling Overlapping in Single-Layer Laser Cladding of a Shaft-Like Workpiece In an embodiment, provided is a system for controlling overlapping in single-layer laser cladding of a shaft-like workpiece, including:

an acceleration time calculation module, for obtaining a shaft diameter of a workpiece to be processed, a feed rate of a feed shaft and a laser cladding width; obtaining a calculation formula of the overlapping rate, and planning motions of the feed shaft and the spindle based on a rotational velocity of a spindle and an S-curve acceleration and deceleration planning algorithm; and calculating a feed velocity of the feed shaft, thereby obtaining acceleration time of the spindle and acceleration time of the feed shaft;

a feed shaft displacement calculation module, for determining whether the acceleration time of the spindle is equal to the acceleration time of the feed shaft; if yes, calculating a displacement of the feed shaft; otherwise, determining whether the acceleration time of the spindle is greater than the acceleration time of the feed shaft; if yes, after the feed shaft accelerates to a preset velocity, keeping the feed shaft at the preset velocity for a period of uniform motion until the spindle reaches the preset velocity; otherwise, re-planning a motion of the spindle according to S-curve acceleration and deceleration; adding a period of uniform acceleration motion for the spindle or reducing a maximum jerk of the spindle, to make the acceleration time of the spindle equal to the acceleration time of the feed shaft; and calculating the displacement of the feed shaft; and a module for adjusting an initial zero position of the laser head in a feed direction according to a difference between the displacement of the feed shaft and a preset clamping allowance.

In another embodiment, provided is a system for controlling overlapping in single-layer laser cladding of a shaft-like workpiece, including:

an acceleration time calculation module, for obtaining a shaft diameter of a workpiece to be processed, a feed rate of a feed shaft and a laser cladding width; obtaining a calculation formula of the overlapping rate, and planning motions of the feed shaft and the spindle based on a rotational velocity of a spindle and an S-curve acceleration and deceleration planning algorithm; and calculating a feed velocity of the feed shaft, thereby obtaining acceleration time of the spindle and acceleration time of the feed shaft;

a feed shaft displacement calculation module, for determining whether the acceleration time of the spindle is equal to the acceleration time of the feed shaft; if yes, calculating a displacement of the feed shaft; otherwise, determining whether the acceleration time of the spindle is greater than the acceleration time of the feed shaft; if yes, re-planning a motion of the feed shaft according to an acceleration triangle planning method, adding a period of uniform acceleration motion of the feed shaft or reducing a maximum jerk of the feed shaft, to make the acceleration time of the spindle equal to the acceleration time of the feed shaft; and calculating the displacement of the feed shaft; otherwise, re-planning a motion of the spindle according to the S-curve acceleration and deceleration; adding the period of uniform acceleration motion for the spindle or reducing the maximum jerk of the spindle, to make the acceleration time of the spindle equal to the acceleration time of the feed shaft; and calculating the total displacement of the feed shaft; and a module for adjusting an initial zero position of the laser head in a feed direction according to a difference between the displacement of the feed shaft and a preset clamping allowance.

Specifically, in the feed shaft displacement calculation module, in an S-curve acceleration and deceleration planning, when the acceleration time of the spindle is greater than the acceleration time of the feed shaft, the motion of the feed shaft is re-planned according to the acceleration triangle planning method to make the spindle and the feed shaft reach their respective preset velocities with the same motion time; when a newly planned feed velocity of the feed shaft is greater than the preset velocity of the feed shaft, the maximum jerk of the feed shaft is reduced to make the newly planned feed velocity of the feed shaft equal to the preset velocity of the feed shaft; when the newly planned feed velocity of the feed shaft is lower than the preset velocity of the feed shaft, the period of uniform acceleration motion of the feed shaft is added to make the newly planned feed velocity of the feed shaft equal to the preset velocity of the feed shaft.

In the above embodiments, the motions of the spindle and the feed shaft are planned based on the S-curve acceleration and deceleration method. The motion planning is dynamically adjusted by comprehensively considering the overlapping rate and the clamping allowance of the workpiece in a feed direction, so that the contradiction between the workpiece clamping allowance and the motion planning of the spindle and the feed shaft is effectively solved, thereby improving the processing efficiency of the workpiece and ensuring the quality of the workpiece cladding layer.

Method, Device and System for Dynamically Adjusting Height of Laser Head of Laser Cladding Machine In view of the shortcomings of the existing laser cladding machine, to compensate workpiece deflection and deformation in real time, dynamically adjust the height of the laser head, and eliminate processing errors caused by deflection and deformation of heavy and long shaft-like workpieces, this embodiment provides a laser head with a laser displacement sensor and a control algorithm for dynamically adjusting the height of the laser head, to realize real-time online measurement of workpiece deflection and deformation, compensate the workpiece deflection and deformation, and eliminate processing errors caused by continuous deflection and deformation of heavy and long-axis workpieces, thereby ensuring the processing quality of the laser cladding machine.

Figure 7:
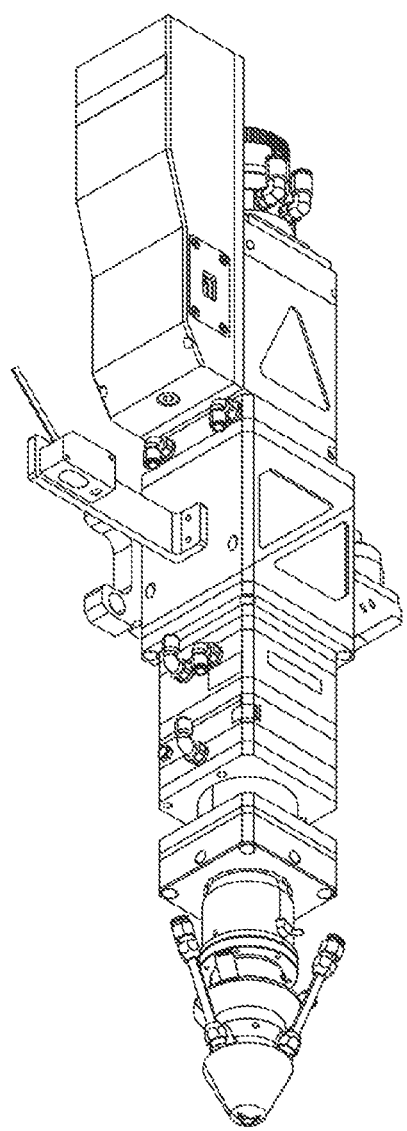
FIG. 7 is a perspective view of a device for dynamically adjusting a height of a laser head of a laser cladding machine according to an embodiment of the disclosure.
Figure 8:
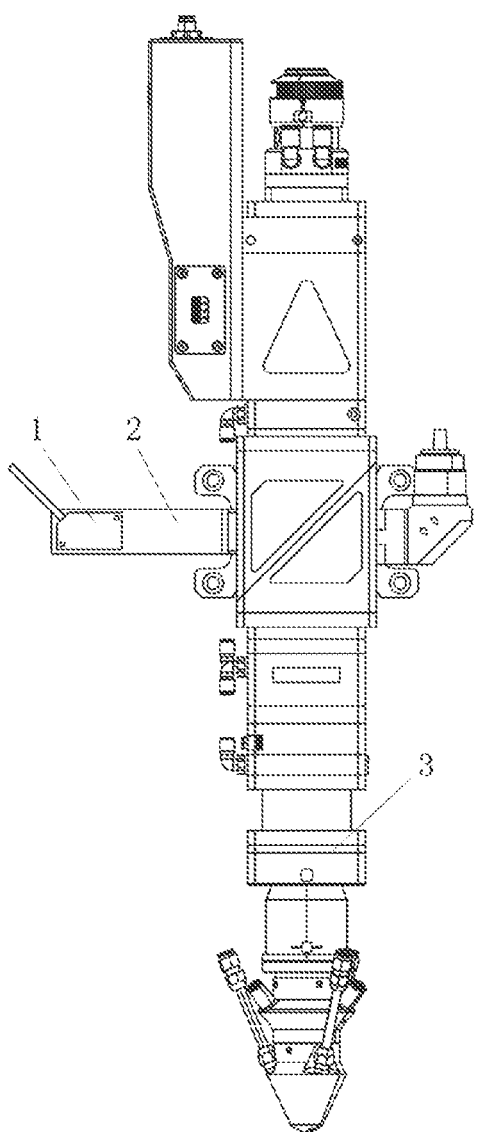
FIG. 8 is a side view of the device for dynamically adjusting the height of the laser head of the laser cladding machine according to an embodiment of the disclosure.
Figure 9:
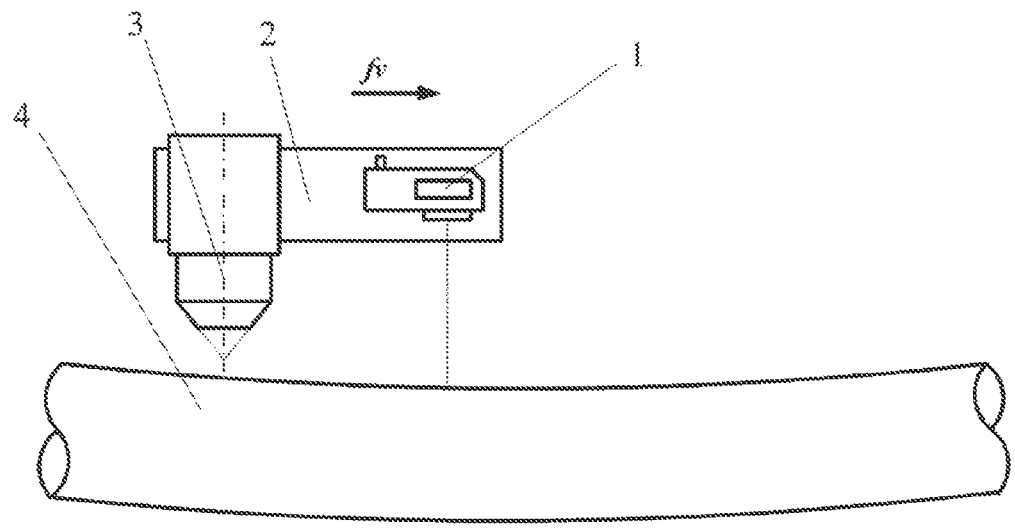
FIG. 9 schematically illustrates a working principle of the device for dynamically adjusting the height of the laser head of the laser cladding machine according to an embodiment of the disclosure.

As shown in FIGS. 7 and 8, in an embodiment, provided is a device for dynamically adjusting a height of a laser head of a laser cladding machine based on a laser displacement sensor, including a laser displacement sensor 1, a sensor flange 2, and a laser head 3, a standard IO module 8, a controller 5, a servo driver 6 and a motor 7 in shafts of the laser cladding machine. As shown in FIG. 9, the laser displacement sensor 1 is arranged on a side wall of the laser head 3 with a parallel offset through the sensor flange 2, and the laser displacement sensor 1 can follow the motion of the laser head 3. The laser displacement sensor 1 collects the distance information between the laser head 3 and the workpiece 4 in real time at a certain frequency, and sends the collected distance information to the controller 5 through the standard IO module 8 in real time. The laser displacement sensor 1 measures the distance between the surface of the workpiece 4 and the laser head 3. Since the laser displacement sensor 1 is arranged on the laser head 3 and follows the motion of the laser head 3, the laser displacement sensor 1 needs to convert the relative distance between the laser head 3 and the workpiece 4 into a coordinate system of the machine during acquisition to realize a unification of the coordinate system.

Figure 11:
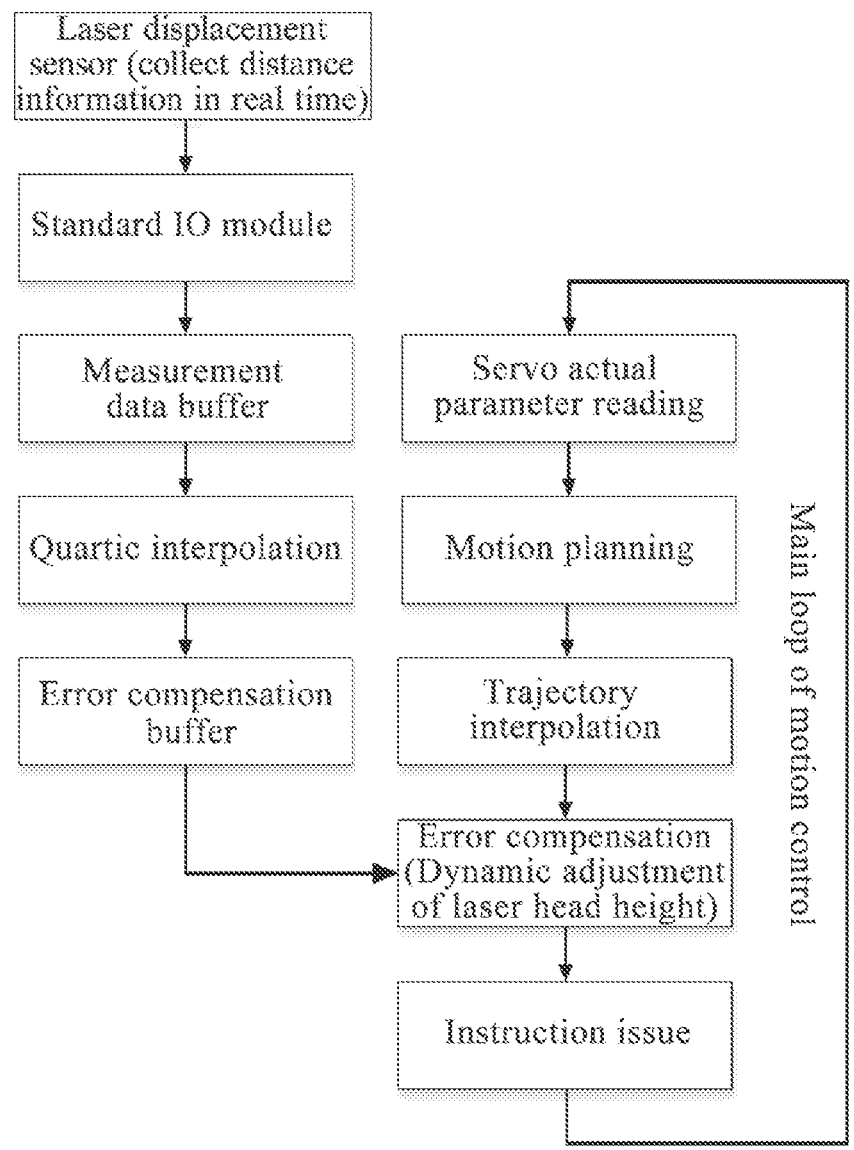
FIG. 11 is a control flowchart of the system for dynamically adjusting the height of the laser head of the laser cladding machine according to an embodiment of the disclosure.

A process of adjusting the height of the laser head 3 is shown in FIG. 11. The laser displacement sensor 1 detects the relative distance between the workpiece 4 and the laser head 3 in real time, and sends discrete distance information to the controller 5 through the standard IO module 8. Since the laser displacement sensor 1 is before the laser head 3 in the feed direction, the data collected by the laser displacement sensor 1 needs to be firstly stored in the controller 5 for subsequent use.

After receiving the discrete distance information sent by the laser displacement sensor 1, the controller 5 queries the current position information of the laser head 3. After the conversion and calculation of the relative position, the controller converts the relative distance information sent by the laser displacement sensor 1 to the coordinate system of the machine, to obtain a series of global coordinate points. The processed global coordinate points are temporarily stored in the measurement data buffer, and the measurement information buffer is refreshed at the same time. The controller 5 takes out the global coordinate points in batches from the measurement data buffer, and obtains the local quartic interpolation functions by using a quartic interpolation method, and stores the function parameters in the error compensation buffer.

The actual parameters of the servo driver 6 in each shaft of the laser cladding machine are read in each communication cycle via a main motion control program in the controller 5. When the laser head 3 needs to perform motion planning, trajectory interpolation and other operations, the controller 5 dynamically interprets the current working area of the laser head 3, and takes out the corresponding interpolation function temporarily stored in the error buffer according to the current working area of the laser head 3, to calculate a current error compensation value of the laser head 3. Then, the controller corrects the current target position of the laser head 3, and refresh the data in the error buffer, and then send a motion instruction to dynamically adjust the height of the laser head 3, thereby realizing a real-time compensation of the deflection and deformation of the workpiece 4, and ensuring the processing accuracy of the cladding layer of the workpiece 4.

Figure 12:
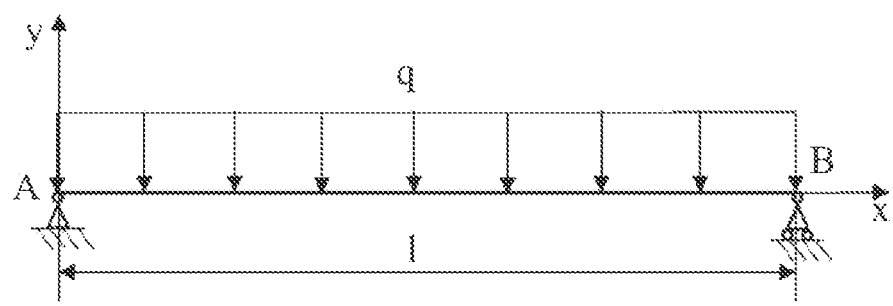
FIG. 12 is a schematic diagram of a force analysis of a workpiece according to an embodiment of the disclosure.

Considering that the heavy and long shaft-like workpieces clamped and rotated by the chuck at both ends is influenced by the gravity. In addition, since the moment of inertia of heavy and long shaft-like workpieces is generally large, in the single-layer high-speed laser cladding, the spindle rotation speed is reduced due to the spindle motion constraint, thereby ensuring that the heavy and long shaft-like workpieces are not prone to deflection changes during the rotation process. Therefore, the workpiece model is comprehensively considered to be simplified to a simply supported beam model under uniform load (as shown in the FIG. 12). The specific interpolation calculation process is as follows:

according to the relevant formulas of material mechanics, it can be obtained:

bending moment $$M(x) = \frac{qlx}{2} - \frac{qx^2}{2};$$

differential equation $$\frac{d^2y}{dx^2} = \frac{M(x)}{EI} = \frac{qlx}{2EI} - \frac{qx^2}{2EI};$$

and boundary conditions $Y(0)=0$, $y(l)=0$;

where q is an uniform load (gravity); l is a length of the simply supported beam; x is a position of the simply supported beam in a length direction; E is an elastic modulus of the material; and I is the moment of inertia of the material stage to the neutral axis of bending. After calculation, the deflection can be obtained as:

$$y(x) = \frac{qx}{24EI}(l^3 - 2lx^2 + x^3).$$

It can be seen that the deflection is a quartic function of the lateral distance. Therefore, if the data collected by the laser displacement sensor 1 is interpolated four times, the accurate interpolation can be achieved theoretically.

Figure 13:
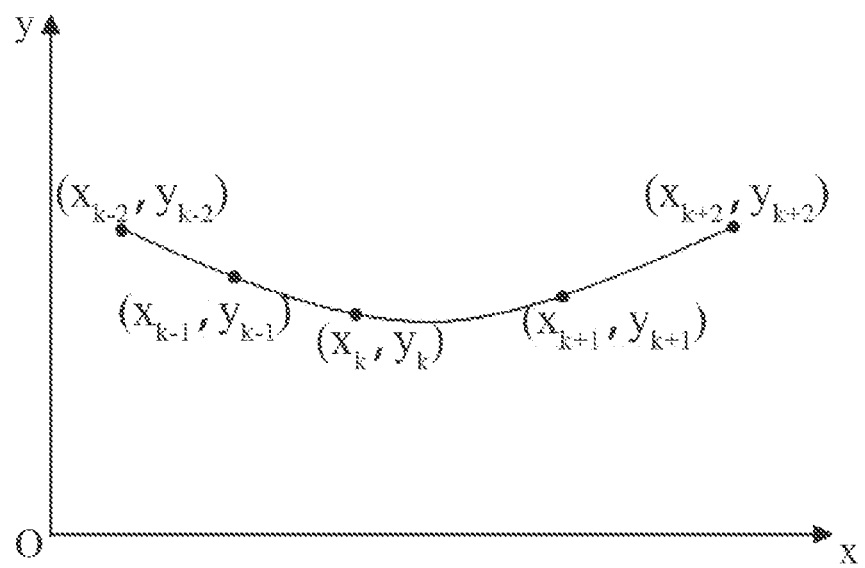
FIG. 13 is a schematic diagram of a quartic interpolation algorithm according to an embodiment of the disclosure.

As shown in FIG. 13, a calculation process of the quartic interpolation is as follows, and it is assumed that the interpolation nodes are $x_{k-2}, x_{k-1}, x_k, x_{k+1}, x_{k+2}$, it is required to satisfy the formula when the quartic interpolation is used to generate the polynomial L4(x):

$$L_4(x_j)=y_j= k-2, k-1, k, k+1, k+2 \quad (42);$$

where j and k are natural numbers, respectively.

The basis function method is adopted, where the basis functions $l_{k-2}(x)$, $l_{k-1}(x)$, $l_k(x)$, $l_{k+1}(x)$, $l_{k+2}(x)$ are quartic functions, and should respectively satisfy the following conditions on nodes as follows:

$$\begin{cases} l_{k-2}(x_{k-2}) = 1 & l_{k-2}(x_j) = 0 & j = k-1, k, k+1, k+2 \\ l_{k-1}(x_{k-1}) = 1 & l_{k-1}(x_j) = 0 & j = k-2, k, k+1, k+2 \\ l_k(x_k) = 1 & l_k(x_j) = 0 & j = k-2, k-1, k+1, k+2 \\ l_{k+1}(x_{k+1}) = 1 & l_{k+1}(x_j) = 0 & j = k-2, k-1, k, k+2 \\ l_{k+2}(x_{k+2}) = 1 & l_{k+2}(x_j) = 0 & j = k-2, k-1, k, k+1 \end{cases} \quad (43)$$

The interpolation basis function that satisfies the condition (43) is simple to be solved, for example, $l_{k-1}(x)$, contains four zero positions $x_{k-2}, x_k, x_{k+1}, x_{k+2}$, it can be expressed as:

$$l_{k-1}(x)=A(x-x_{k-2})(x-x_k)(x-x_{k+1})(x-x_{k+2})$$

where A is a coefficient to be determined, which can be obtained by the condition $l_{k-1}(x_{k-1})=1$:

$$A = \frac{1}{(x_{k-1} - x_{k-2})(x_{k-1} - x_k)(x_{k-1} - x_{k+1})(x_{k-1} - x_{k+2})};$$

then $$l_{k-1}(x) = \frac{(x - x_{k-2})(x - x_k)(x - x_{k+1})(x - x_{k+2})}{(x_{k-1} - x_{k-2})(x_{k-1} - x_k)(x_{k-1} - x_{k+1})(x_{k-1} - x_{k+2})};$$

Similarly, it can be obtained that $$l_{k-2}(x) = \frac{(x-x_{k-1})(x-x_k)(x-x_{k+1})(x-x_{k+2})}{(x_{k-2}-x_{k-1})(x_{k-2}-x_k)(x_{k-2}-x_{k+1})(x_{k-2}-x_{k+2})}$$

$$l_k(x) = \frac{(x-x_{k-2})(x-x_{k-1})(x-x_{k+1})(x-x_{k+2})}{(x_k-x_{k-2})(x_k-x_{k-1})(x_k-x_{k+1})(x_k-x_{k+2})}$$

$$l_{k+1}(x) = \frac{(x-x_{k-2})(x-x_{k-1})(x-x_k)(x-x_{k+2})}{(x_{k+1}-x_{k-2})(x_{k+1}-x_{k-1})(x_{k+1}-x_k)(x_{k+1}-x_{k+2})}$$

$$l_{k+2}(x) = \frac{(x-x_{k-2})(x-x_{k-1})(x-x_k)(x-x_{k+1})}{(x_{k+2}-x_{k-2})(x_{k+2}-x_{k-1})(x_{k+2}-x_k)(x_{k+2}-x_{k+1})}.$$

The quartic interpolation polynomial $L_4(x)$ can be obtained by using the quartic interpolation basis function $l_{k-2}(x)$, $l_{k-1}(x)$, $l_k(x)$, $l_{k+1}(x)$, $l_{k+2}(x)$ in the interval $[x_{k-2}, x_{k+2}]$ as follows:

$$L_4(x) = y_{k-2}l_{k-2}(x) + y_{k-1}l_{k-1}(x) + y_k l_k(x) + y_{k+1}l_{k+1}(x) + y_{k+2}l_{k+2}(x) \quad (44);$$

The $l_{k-2}(x)$, $l_{k-1}(x)$, $l_k(x)$, $l_{k+1}(x)$, $l_{k+2}(x)$ obtained above are plugged into the equation (44) to obtain:

$$L_4(x) = y_{k-2}\frac{(x-x_{k-1})(x-x_k)(x-x_{k+1})(x-x_{k+2})}{(x_{k-2}-x_{k-1})(x_{k-2}-x_k)(x_{k-2}-x_{k+1})(x_{k-2}-x_{k+2})} +$$

$$y_{k-1}\frac{(x-x_{k-2})(x-x_k)(x-x_{k+1})(x-x_{k+2})}{(x_{k-1}-x_{k-2})(x_{k-1}-x_k)(x_{k-1}-x_{k+1})(x_{k-1}-x_{k+2})} +$$

$$y_k\frac{(x-x_{k-2})(x-x_{k-1})(x-x_{k+1})(x-x_{k+2})}{(x_k-x_{k-2})(x_k-x_{k-1})(x_k-x_{k+1})(x_k-x_{k+2})} +$$

$$y_{k+1}\frac{(x-x_{k-2})(x-x_{k-1})(x-x_k)(x-x_{k+2})}{(x_{k+1}-x_{k-2})(x_{k+1}-x_{k-1})(x_{k+1}-x_k)(x_{k+1}-x_{k+2})} +$$

$$y_{k+2}\frac{(x-x_{k-2})(x-x_{k-1})(x-x_k)(x-x_{k+1})}{(x_{k+2}-x_{k-2})(x_{k+2}-x_{k-1})(x_{k+2}-x_k)(x_{k+2}-x_{k+1})}.$$

Through the above method, the continuous deformation of the discrete heavy and long shaft-like workpieces is interpolated four times to obtain the local segmented continuous deformation function of the workpiece, and the deformation of any point of the workpiece 4 is obtained to realize the real-time compensation of bending deformation the deflection of the workpiece 4, so that the height of the laser head 3 can be dynamically adjusted, thereby ensuring the processing quality of the cladding layer of the workpiece 4.

Figure 10:
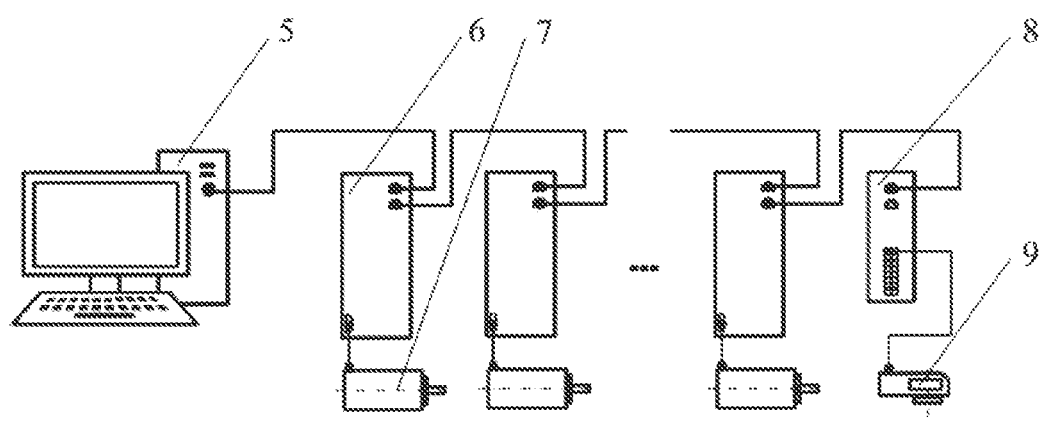
FIG. 10 is a schematic diagram of a system for dynamically adjusting the height of the laser head of the laser cladding machine according to an embodiment of the disclosure.

As shown in FIG. 10, in an embodiment, provided is a system for dynamically adjusting a height of a laser head of a laser cladding machine, including a data acquisition system, a data processing system; an error compensation system; and a motion control system.

The data acquisition system acquires, through the laser displacement sensor, distance information between the laser head and the workpiece in real time at a certain frequency, and transmits the collected distance information to the controller through the standard IO module in real time for storage.

The data processing system reads the discrete local deflection parameters of the workpiece sent by the data acquisition system from the controller and the current position information of the laser head queried by the motion control system, and perform a relative position conversion to obtain global coordinate points in a machine coordinate system; the data processing system sends the processed global coordinate points to the controller; the controller stores the global coordinate points in a measurement data buffer and refreshes the measurement data buffer.

The error compensation system takes out the global coordinate points in batches from the measurement data buffer, and obtains the continuous local quartic interpolation function using a quartic interpolation method, and stores parameters of the quartic interpolation function in an error compensation buffer of the controller.

The motion control system dynamically interprets a current working area of the laser head in each communication cycle, and takes out parameters of an interpolation function corresponding to a current working area of the laser head temporarily stored in the error buffer, and calculates a current error compensation value of the laser head according to the parameters of the interpolation function, and correct a current target position of the laser head, refresh the data in the error buffer, and send motion instructions to dynamically adjust the height of the laser head.

The foregoing descriptions are only illustrative of the application, and are not intended to limit the application. For those skilled in the art, the application can have various modifications and changes. Any modification, equivalent replacement and improvement within the spirit and principle of this application shall fall within the protection scope of this application.

Although the above description of the specific implementation of the application is made in conjunction with the drawings, it does not limit the scope of protection of the application. It should be understood that on the basis of the technical solution of the application, various modifications or variations made by those skilled in the art without creative work should still within the protection scope of this application.

What is claimed is:

1. A system for controlling overlapping in single-layer laser cladding of a shaft-like workpiece, comprising:
    a processor is configured for obtaining a shaft diameter of the shaft-like workpiece to be processed, a feed rate of a feed shaft and a laser cladding width; obtaining a calculation formula of an overlapping rate of a single-layer laser cladding, wherein the overlapping rate of the single-layer laser cladding is a ratio of a width of an intersection of two cladding layers to a width of a single cladding layer; planning a motion of the feed shaft and a motion of a spindle based on a rotational velocity of the spindle and an S-curve acceleration and deceleration planning algorithm which comprises steps of calculating a total time required for the spindle and the feed shaft to reach respective preset velocities, calculating a feed velocity of the feed shaft to obtain acceleration time of the spindle and to obtain acceleration time of the feed shaft, and comparing the acceleration time of the feed shaft and the acceleration time of the spindle;
    determining whether the acceleration time of the spindle is equal to the acceleration time of the feed shaft; if yes, calculating a displacement of the feed shaft; otherwise, determining whether the acceleration time of the spindle is greater than the acceleration time of the feed shaft; if yes, after the feed shaft accelerates to a preset velocity, keeping the feed shaft at the preset velocity for a period of uniform motion until the spindle reaches the preset velocity; otherwise, re-planning a motion of the spindle according to S-curve acceleration and deceleration; adding a period of uniform acceleration motion for the spindle or reducing a maximum jerk of the spindle to make the acceleration time of the spindle equal to the acceleration time of the feed shaft; and calculating a total displacement of the feed shaft; and adjusting an initial zero position of a laser head in a feed direction according to a difference between the total displacement of the feed shaft and a preset clamping allowance.

2. A system for controlling overlapping in single-layer laser cladding of a shaft-like workpiece, comprising:

a processor is configured for obtaining a shaft diameter of the shaft-like workpiece to be processed, a feed rate of a feed shaft and a laser cladding width; obtaining a calculation formula of an overlapping rate of a single-layer laser cladding, wherein the overlapping rate of the single-layer laser cladding is a ratio of a width of an intersection of two cladding layers to a width of a single cladding layer; planning a motion of the feed shaft and a motion of a spindle based on a rotational velocity of the spindle and an S-curve acceleration and deceleration planning algorithm which comprises steps of calculating a total time required for the spindle and the feed shaft to reach respective preset velocities, calculating a feed velocity of the feed shaft to obtain acceleration time of the spindle and to obtain acceleration time of the feed shaft, and comparing the acceleration time of the feed shaft and the acceleration time of the spindle;

determining whether the acceleration time of the spindle is equal to the acceleration time of the feed shaft; if yes, calculating a displacement of the feed shaft; otherwise, determining whether the acceleration time of the spindle is greater than the acceleration time of the feed shaft; if yes, re-planning a motion of the feed shaft according to an acceleration triangle planning method, adding a period of uniform acceleration motion of the feed shaft or reducing a maximum jerk of the feed shaft to make the acceleration time of the spindle equal to the acceleration time of the feed shaft, and then calculating the displacement of the feed shaft; otherwise, re-planning a motion of the spindle according to S-curve acceleration and deceleration, adding a period of uniform acceleration motion for the spindle or reducing the maximum jerk of the spindle to make the acceleration time of the spindle equal to the acceleration time of the feed shaft, and calculating a total displacement of the feed shaft; and adjusting an initial zero position of a laser head in a feed direction according to a difference between the total displacement of the feed shaft and a preset clamping allowance.

3. The system of claim 2, wherein in an S-curve acceleration and deceleration planning, when the acceleration time of the spindle is greater than the acceleration time of the feed shaft, the motion of the feed shaft is re-planned according to an acceleration triangle planning method to make the spindle and the feed shaft reach their respective preset velocities with the same motion time; when a newly planned feed velocity of the feed shaft is greater than the preset velocity of the feed shaft, the maximum jerk of the feed shaft is reduced to make the newly planned feed velocity of the feed shaft equal to the preset velocity of the feed shaft; when the newly planned feed velocity of the feed shaft is lower than the preset velocity of the feed shaft, the period of uniform acceleration motion of the feed shaft is added to make the newly planned feed velocity of the feed shaft equal to the preset velocity of the feed shaft.

* * * * *